(12) United States Patent
McKie et al.

(10) Patent No.: US 9,206,991 B2
(45) Date of Patent: Dec. 8, 2015

(54) SYSTEM AND METHOD FOR MONITORING AND REPORTING ENERGY RECOVERY VENTILATOR POWER CONSUMPTION AND SERVICE AND MAINTENANCE NEEDS

(75) Inventors: Justin McKie, Frisco, TX (US); Eric Perez, Hickory Creek, TX (US); Greg Thomas, McKinney, TX (US)

(73) Assignee: Lennox Industries Inc., Richardson, TX (US)

( * ) Notice: Subject to any disclaimer, the term of this patent is extended or adjusted under 35 U.S.C. 154(b) by 910 days.

(21) Appl. No.: 13/292,761

(22) Filed: Nov. 9, 2011

(65) Prior Publication Data

US 2013/0116951 A1 May 9, 2013

(51) Int. Cl.
  G06F 11/34  (2006.01)
  F24F 3/14  (2006.01)
  F24F 12/00  (2006.01)
  F24F 11/00  (2006.01)

(52) U.S. Cl.
  CPC ........... *F24F 3/1423* (2013.01); *F24F 11/0086* (2013.01); *F24F 12/001* (2013.01); *F24F 11/0001* (2013.01); *F24F 12/006* (2013.01); *F24F 2011/0094* (2013.01); *F24F 2203/104* (2013.01); *Y02B 30/542* (2013.01); *Y02B 30/563* (2013.01)

(58) Field of Classification Search
  USPC .......................................................... 702/61
  See application file for complete search history.

(56) References Cited

U.S. PATENT DOCUMENTS

| | | | | |
|---|---|---|---|---|
| 5,497,823 A | * | 3/1996 | Davis ............................ | 165/231 |
| 2005/0236150 A1 | * | 10/2005 | Chagnot et al. .............. | 165/222 |
| 2007/0205297 A1 | * | 9/2007 | Finkam et al. .................... | 236/1 |
| 2010/0198411 A1 | * | 8/2010 | Wolfson ........................ | 700/275 |
| 2011/0088417 A1 | * | 4/2011 | Kayser ............................... | 62/94 |
| 2011/0146941 A1 | * | 6/2011 | Benoit et al. ................. | 165/11.1 |
| 2012/0253526 A1 | * | 10/2012 | Storm ........................... | 700/278 |
| 2013/0032310 A1 | * | 2/2013 | Jaena et al. .............. | 165/104.25 |
| 2013/0087302 A1 | * | 4/2013 | McKie et al. ...................... | 165/8 |
| 2013/0090051 A1 | * | 4/2013 | McKie et al. ................. | 454/229 |
| 2013/0090769 A1 | * | 4/2013 | McKie et al. ................. | 700/277 |
| 2013/0116951 A1 | * | 5/2013 | McKie et al. ................... | 702/61 |
| 2013/0180700 A1 | * | 7/2013 | Aycock ......................... | 165/248 |

OTHER PUBLICATIONS

U.S. Appl. No. 13/274,530 filed by McKie, et al., on Oct. 17, 2011 entitled, "An ERV With Offset and Overlapping Enthalpy Wheels", 29 pages.

U.S. Appl. No. 13/274,562 filed by McKie, et al., on Oct. 17, 2011 entitled, "A Transition Module for an ERV" 32 pages.

U.S. Appl. No. 13/274,587 (filed by McKie, et al., on Oct. 17, 2011, entitled, "Sensor Mounting Panel for an ERV", 30 pages.

U.S. Appl. No. 13/274,629 filed by McKie, et al., on Oct. 17, 2011, entitled, "Design Layout for an Energy Recovery Ventilator System", 30 pages.

* cited by examiner

Primary Examiner — Paul D Lee
(74) Attorney, Agent, or Firm — Baker Botts, LLP

(57) ABSTRACT

A system for, and method of, monitoring and reporting ERV power consumption and service and maintenance needs. In one embodiment, the system includes: (1) a processor configured to carry out a plurality of monitoring and reporting functions related to ERV power consumption and service and maintenance needs based on a model, and types and locations of sensors, of the ERV, (2) a memory coupled to the processor and configured to store data gathered from the sensors and (3) a commissioning database associated with the memory and configured to contain commissioning data regarding the model of the ERV and the service and maintenance needs.

20 Claims, 5 Drawing Sheets

SYSTEM AND METHOD FOR MONITORING AND REPORTING ENERGY RECOVERY VENTILATOR POWER CONSUMPTION AND SERVICE AND MAINTENANCE NEEDS

CROSS-REFERENCE TO RELATED APPLICATION

The present application is related to U.S. patent application Ser. No. 13/274,530 filed by McKie, et al., on Oct. 17, 2011 entitled, "An ERV With Offset and Overlapping Enthalpy Wheels" ("Appl-1"); U.S. patent application Ser. No. 13/274,562 filed by McKie, et al., on Oct. 17, 2011 entitled, "A Transition Module for an ERV" ("Appl-2"); U.S. patent application Ser. No. 13/274,587 (filed by McKie, et al., on Oct. 17, 2011, entitled, "Sensor Mounting Panel for an ERV" ("Appl-3"); U.S. patent application Ser. No. 13/274,629 filed by McKie, et al., on Oct. 17, 2011, entitled, "Design Layout for an Energy Recovery Ventilator System" ("Appl-4"), all commonly assigned with the present application and incorporated herein by reference.

TECHNICAL FIELD

This application is directed, in general, to heating, ventilation and air conditioning (HVAC) systems and, more specifically, to a system and method for monitoring and reporting energy recovery ventilator power consumption and service and maintenance needs.

BACKGROUND

ERVs are used to capture energy from the exhaust air stream and through the use of enthalpy-wheels it transfers a large portion of the waste heat back into outside air intake stream. By pre-treating the outside air, cooling and heating loads are reduced. ERVs are popular in regions with high outside air humidity or extremely low or high ambient outside air temperature. This is because energy transfer increases as the temperature difference between the occupied space and the outside air increases. ERVs operate during the occupied period of a building.

When ERVs first came to market, they were often not serviced correctly, in many cases causing the equipment to fail to deliver promised benefits. Today, fresh-air ventilation requirements on commercial buildings in on the rise. This has renewed interest in technologies that can minimize the financial impact of conditioning outside air. Accordingly, ERVs are once again becoming popular in the marketplace.

SUMMARY

One aspect provides a system for monitoring and reporting ERV power consumption and service and maintenance needs. In one embodiment, the system includes: (1) a processor configured to carry out a plurality of monitoring and reporting functions related to ERV power consumption and service and maintenance needs based on a model, and types and locations of sensors, of the ERV, (2) a memory coupled to the processor and configured to store data gathered from the sensors and (3) a commissioning database associated with the memory and configured to contain commissioning data regarding the model of the ERV and the service and maintenance needs.

Another aspect provides a method of monitoring and reporting ERV power consumption and service and maintenance needs. In one embodiment, the method includes: (1) carrying out a plurality of monitoring and reporting functions related to ERV power consumption and service and maintenance needs based on a model, and types and locations of sensors, of the ERV, the carrying out including employing commissioning data regarding the model of the ERV and (2) storing data gathered from the sensors.

BRIEF DESCRIPTION

Reference is now made to the following descriptions taken in conjunction with the accompanying drawings, in which.

DETAILED DESCRIPTION

As stated above, ERVs were often not serviced correctly when they first came to market. Now that ERVs are once again becoming popular in the marketplace and information processing and storage technologies are far better than they were decades ago, an opportunity has arisen to provide better ways to monitor and track how ERVs are performing so they can be serviced correctly and demonstrate their value. In general, an opportunity exists to provide better information for confirming ERV energy savings and efficiency and tracking service and maintenance. Beyond extending the lifespan and justifying the continued use of existing installations, the same information can be used to convince potential customers that ERVs have significantly improved and are worth a try, or perhaps another try.

Described herein are various embodiments of a system and method for monitoring and reporting ERV power consumption and service and maintenance needs. The embodiments employ data sources, namely different combinations of predetermined data sources and real-time sensor data sources, to generate information regarding the power consumption of the ERV and prompting service and maintenance to be performed on the ERV. Certain embodiments of the system and method are embodied in software executing in a processor (e.g., a microprocessor or microcontroller), allowing the functions, capabilities and capacities of the system to be changed as data sources are added or removed or information requirements change.

In some embodiments to be illustrated and described, the system and method are configured to monitor ERV performance in real time and generate an alert when energy transfer is below a threshold, indicating that ERV maintenance would be beneficial. In other embodiments to be illustrated and described, the system and method are configured to track information over time and keep a log of it, providing information on the operating history of the ERV.

The term, "or," as used herein, refers to an inclusive or, unless otherwise indicated. Also, the various embodiments described herein are not necessarily mutually exclusive, as some embodiments can be combined with one or more other embodiments to form new embodiments.

Figure 1:
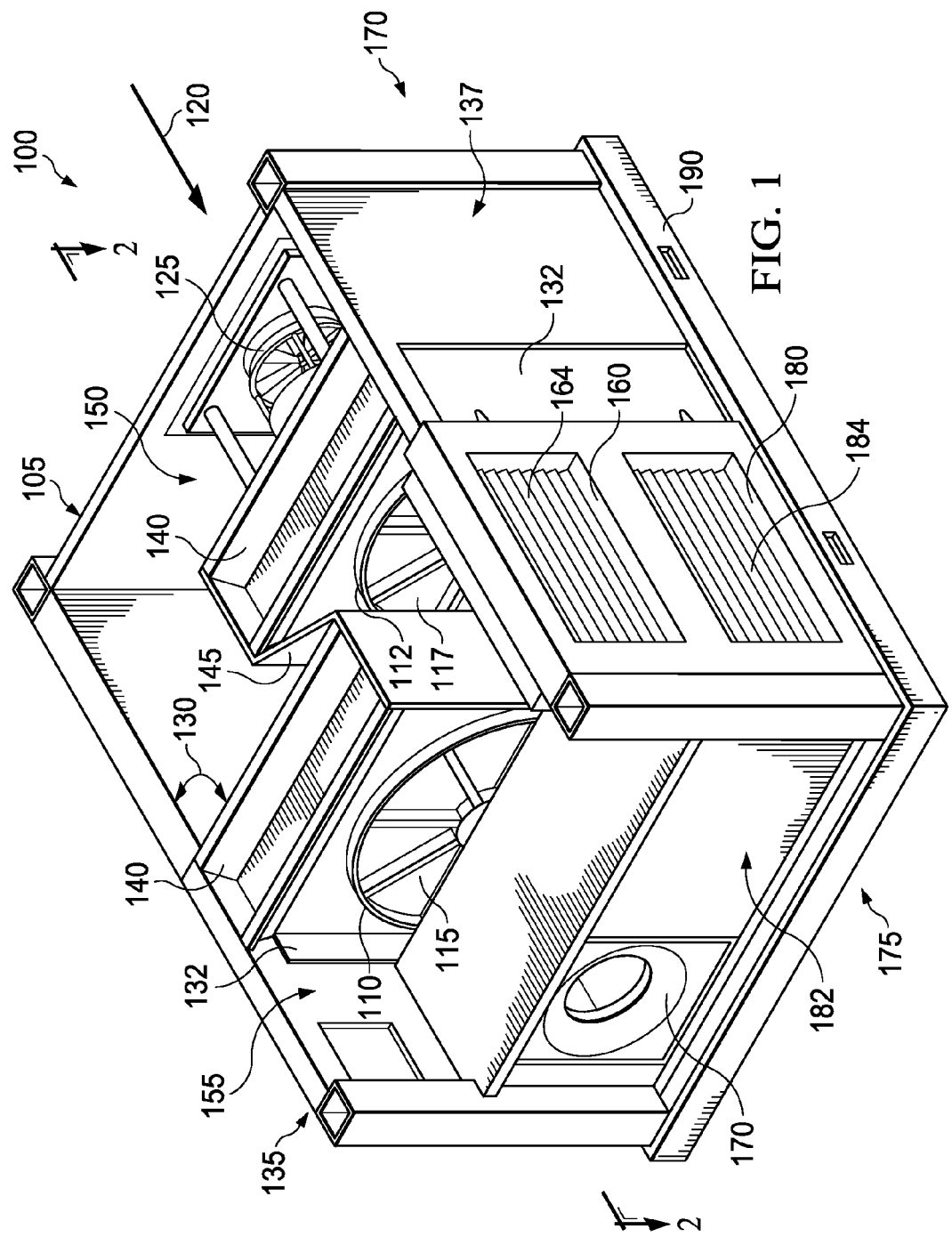
FIG. 1 is a schematic view of one embodiment of an ERV.
Figure 2:
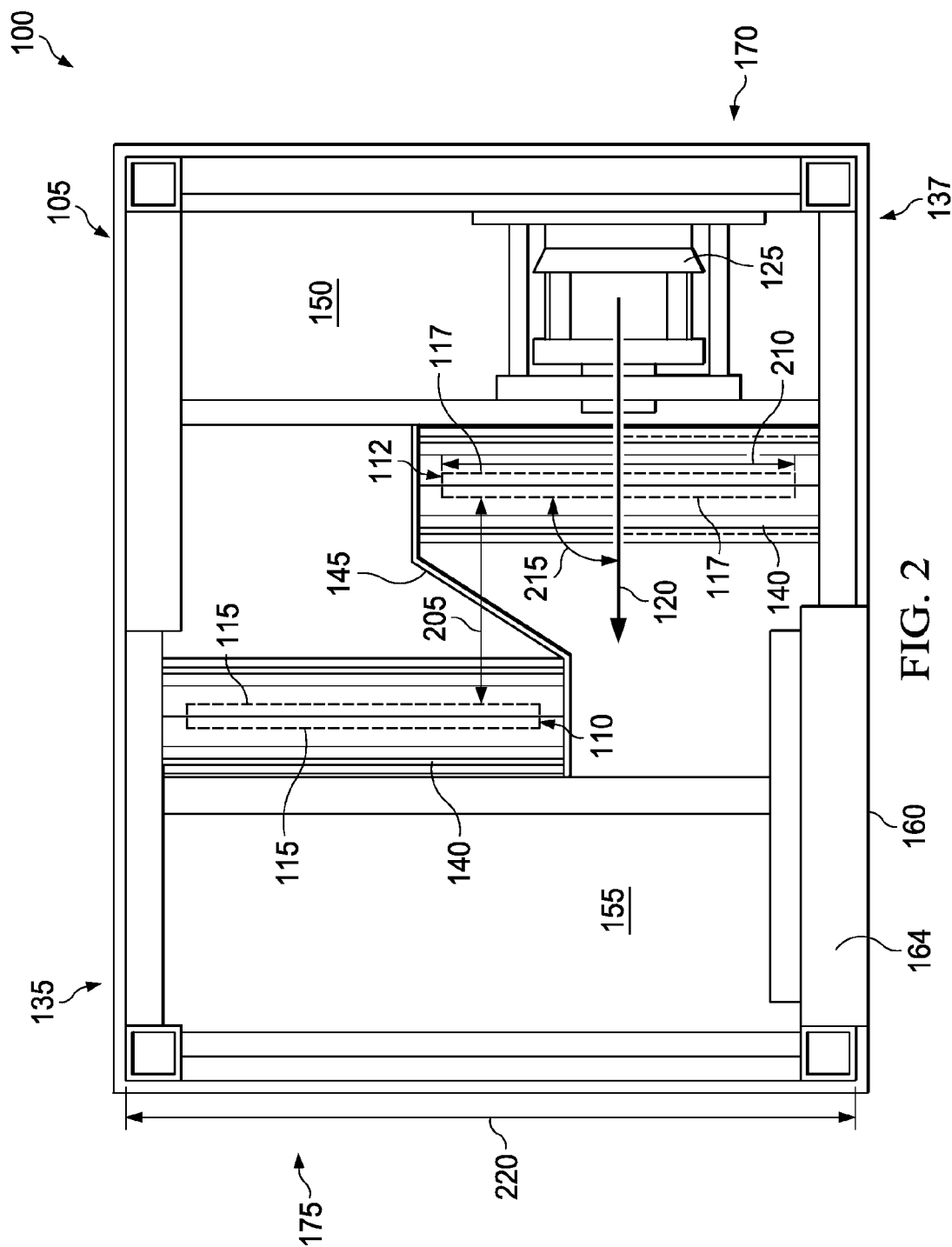
FIG. 2 is an overhead view of the schematic view of one embodiment of the ERV of FIG. 1.
Figure 3:
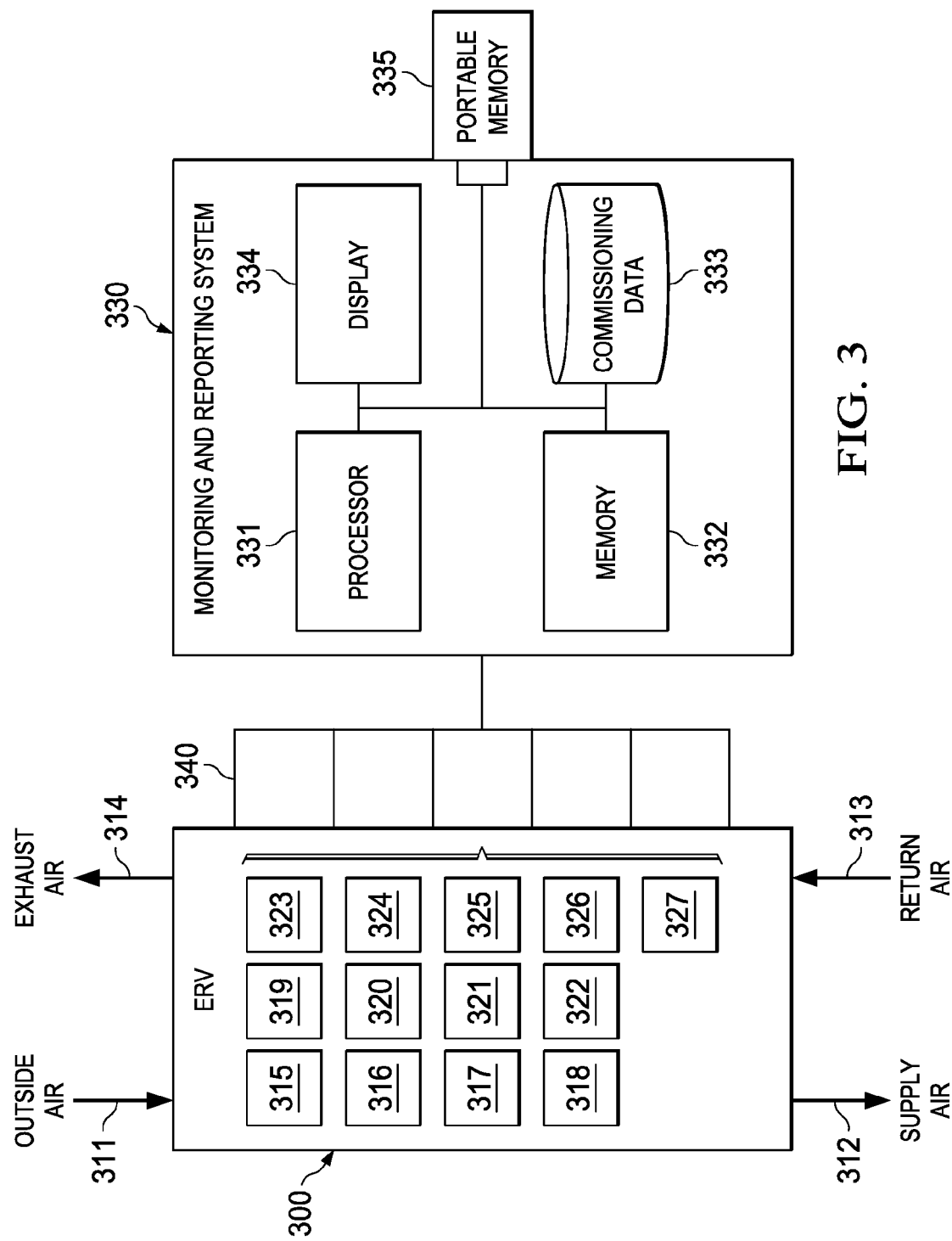
FIG. 3 is a block diagram of one embodiment of a system for monitoring and reporting ERV power consumption and service and maintenance needs.

One embodiment of the present disclosure is an ERV. FIG. 1 presents a schematic view of an example ERV 100 of the disclosure. FIG. 2 presents an overhead view of the schematic view of the example ERV 100 presented in FIG. 1. FIG. 3 presents a block diagram of one embodiment of a system for monitoring an reporting ERV power consumption and service and maintenance needs.

As illustrated in FIG. 1, the ERV 100 comprises a cabinet 105 and a plurality of enthalpy wheels 110, 112 mounted in the cabinet 105. The wheels 110, 112 are mounted such that major surfaces 115, 117 of each of the enthalpy wheels 110, 112 are substantially perpendicular to a direction 120 of primary forced-air intake into the cabinet 105 (e.g., via an intake blower 125), and, the major surface 115 of one of the enthalpy wheels (e.g., one of surface 115 or surface 117, of one of the wheels 110, 115) substantially overlaps, in the direction 120 of primary forced-air intake, with the major surface of at least one of the other enthalpy wheels (e.g., the other one of the surfaces 115, 117 of the other of wheels 110, 112).

Mounting the wheels 110, 112 so that their major surfaces 115, 117 substantially overlap facilitates housing the wheels in a smaller-sized cabinet 105 than otherwise possible when using a single wheel, or, when using a plurality of side-by-side wheels. It is surprising that such a configuration can be used to obtain desirable levels of energy recovery because of the perception that off-setting and overlapping the wheels in this fashion would have negative effects of airflow distribution on energy transfer. For instance, certain commercial suppliers of enthalpy wheels supplier recommend a maximum overlap of no more that 15% to avoid negative effects of air-flow distribution on energy transfer.

As part of the present disclosure, however, it was discovered that by substantially separating the enthalpy wheels 110, 112 from each other, negative air-flow distribution effects can be minimized, resulting in little to no loss in energy recovery effectiveness as compared to unit with a single wheel, or of side-by-side wheels, having major surfaces of comparable total area.

An additional benefit is that in some cases, the total cost of the plurality of the smaller-diameter wheels 110, 112 can be less than the cost of a single large wheel. Moreover, the individual weight of smaller-diameter wheels can be low enough that that single installer can pick up and move the wheel around, thereby reducing the cost of servicing or installing the unit 100. Also, the use of a plurality of wheels 110, 112 may provide a redundancy of function. For instance, if one wheel becomes inoperable, one or more of the other wheels can still have some functionality, which may not the case when using a unit with a single wheel.

For the purposes of the present disclosure, the term substantially separated from each other, as used herein, means that the opposing major surface areas of two adjacent wheels 110, 112 are separated by a distance 205 (FIG. 2), in the direction 120 of primary air intake, that is far enough apart that a desired airflow rate through the cabinet 105 (e.g., about 4000 cubic feet per minute, in some embodiments) can be achieved without have to expend more than 125% of the power to achieve the same airflow rate for a cabinet design having a single wheel, or side-by-side wheel, configurations with major surfaces of comparable total area. One skilled in the art, based on the present disclosure, would appreciate that the specific distance 205 separating two adjacent wheels 110, 112 would depend on the extent of overlap between the wheels 110, 112 and the desired airflow rate.

In some embodiments, the enthalpy wheels 110, 112 are separated, in the direction 120 of primary forced-air intake, by the distance 205 equal to or greater than one-third of a diameter 210 of two adjacent ones of the enthalpy wheels 110, 112. For example, in some embodiments of the unit 100, two of the enthalpy wheels 110, 112 have a same diameter 210 of about 35 inches. In such cases, the two wheels 110, 112 can be separated by a distance 205 of about 12 or more inches. In embodiments where there are two wheels of different diameters, then the separation distance 205 can be equal to or greater than the about one-third of the smallest diameter wheel of the two adjacent wheels.

For the purposes of the present disclosure, the term substantially perpendicular to the direction of primary forced-air intake, as used herein, means that the average direction 120 of forced air from the intake blower 125 in the cabinet 105 forms an angle 215 with respect to the major surfaces 115, 117 that equals about 90°±20°.

For the purposes of the present disclosure, the term "substantially overlap," as used herein, means that there is greater than 15% overlap between either of the major surfaces 115, 117 of adjacent pairs of the enthalpy wheels 110, 112 which overlap in the direction 120 of forced airflow. For instance, if the total area of the major surfaces 115, 117 of two same-sized wheels each equals 100 arbitrary area units of measure, then more than 15 area units of measure are in an overlap zone for either of the wheels 110, 112. For instance, in some embodiments of the unit 100, the major surface areas 115, 117 of two of the enthalpy wheels 110, 112 overlap by up to about 50% of the total area of either of the enthalpy wheel's major surfaces 115, 117. Moreover in some such embodiments, the separation distance 205 can be equal to or greater than one-third of a diameter 210 of same-sized wheels 110, 112.

As illustrated in FIG. 1, in some embodiments, the major surfaces 115, 117 of each of the enthalpy wheels 110, 112 are vertically oriented in the cabinet 105, and, the wheels 110, 112 are arranged substantially parallel to each other. For instance, the major surfaces 115, 117 of the wheels 110, 112 are substantially perpendicular (e.g., forming an angle 130 of 90±10) with respect to sidewalls 135, 137 of the cabinet 105.

Having such a vertical orientation and parallel arrangement can facilitate removal of the enthalpy wheels 110, 112, from the cabinet 105 for cleaning or replacement, e.g., by sliding the wheels 110, 112 out of the cabinet (e.g., by sliding the each wheel through one or more service doors 132), without having to lift the wheels 110, 112 or to remove more than one wheel at a time, such as the case for certain tilt-mounted wheel configurations (e.g., a so-called "V-bank" configuration) or side-by-side configurations. Additionally, the casings 140 used to hold the vertically orientated and parallel arranged wheels 110, 112 can have less parts and be easier to manufacture than assemblies that hold wheels in a tilted configuration in a cabinet.

As further illustrated in FIGS. 1 and 2, in some embodiments each of the enthalpy wheels 110, 112 are housed in their own casings 140, and, a partitioning wall 145 connects the casings 140 together to form an air-tight and moisture-tight seal in the cabinet 105. That is, the partitioning wall 145 is configured to be sealed such that air and moisture can only travel through the enthalpy wheels 110, 112 from one zone (e.g. an intake zone 150) to another zone (e.g., a supply zone 155), in the cabinet 105. As illustrated in FIG. 2, in some cases, the enthalpy wheels 110, 112, and the partitioning wall 145, after being connected together through the wall 145, form a Z-shaped, or transposed Z-shaped, pattern that is recognizable from certain overhead views of the unit 100. However, embodiments of the unit 100 are not necessarily limited to having such patterns.

FIG. 3 is a block diagram of one embodiment of a system for monitoring and reporting ERV power consumption and service and maintenance needs 330. FIG. 3 shows an ERV 300, which may be the ERV 100 of FIGS. 1 and 2. Those skilled in the pertinent art should understand that alternative embodiments of the monitoring and reporting system 330 operate with ERV embodiments other than the ERV 100.

The ERV 100 has two passages therethrough. A first passage (not shown) admits and conditions outside air 311 to produce supply air 312. A second passage (not shown) admits return air 313 to produce exhaust air 314. One or more enthalpy wheels (not shown) are located in the ERV 100 and use the return air 313 as a heat source or sink to condition the outside air 311.

The ERV 100 has a plurality of sensors 315-326. A pressure sensor 315 is configured to measure the difference between the outside air 311 and the supply air 312 proximate the one or more enthalpy wheels. Temperature sensors 316, 317, 318 are configured respectively to measure the temperature of the outside air 311, the supply air 312 and the return air 313. A pressure sensor 319 is configured to measure the pressure difference between the return air 313 and the exhaust air 314 proximate the one or more enthalpy wheels. While not present on all embodiments of an ERV, the sensors 315-319 are found on most ERVs.

Various embodiments of the ERV 100 also have various combinations of additional sensors 320-326. A dirty filter sensor 320 is configured to measure the pressure drop across an air filter (not shown) in the ERV 300. An ERV pressure sensor 321 is configured to measure the overall pressure inside the ERV 300. A flow rate sensor 322 is configured to measure the flow rate of the outside air 311 into the ERV 300. A flow rate sensor 323 is configured to measure the flow rate of the exhaust air 314 out of the ERV 300. Enthalpy sensors 324, 325, 326, 327 are configured respectively to measure the temperature and humidity of the outside air 311, the supply air 312, the return air 313 and the exhaust air 314.

The illustrated embodiment of the monitoring and reporting system 330 includes a processor 331 (e.g., a microprocessor or a microcontroller). A memory 332, which may include one or more of random-access memory (RAM), read-only memory (ROM) or programmable ROM (PROM) (e.g., flash memory), is coupled to the processor 331. In some embodiments of the monitoring and reporting system 330, the processor 331 and the memory 332 are colocated on a single integrated circuit (IC) substrate. A data bus 340 couples the plurality of sensors 315-326 of the ERV 300 to the monitoring and reporting system 330. In one embodiment, the monitoring and reporting system 330 is contained in or mounted on the ERV 300, in which case the data bus 340 is likely contained in the ERV 300. In general, the memory is configured to store data gathered from the plurality of sensors 315-326.

A commissioning database 333 is coupled to the processor 331 and the memory 332 and is configured to contain commissioning data that is typically loaded into the monitoring and reporting system 330 at the factory or in the field during installation of the ERV 300 and monitoring and reporting system 330. The commissioning data includes data specific to the model of ERV 300 to which the monitoring and reporting system 330 is coupled. The commissioning data may include, for example, air flow rates accommodated by the ERV 300, pressure drop thresholds for the ERV 300, service and maintenance schedules for the ERV 300 and such other data that may play a role in the provision of information regarding the performance of the ERV 300 that a customer may find helpful.

The illustrated embodiment of the monitoring and reporting system 330 includes a display 334 coupled to the processor 331 and memory 332. The display 334 is configured to provide information to a customer or a repairman in visual form. In some embodiments, the display 334 includes one or more indicator lamps or light-emitting diodes (LEDs). In other embodiments, the display 334 includes a liquid crystal display (LCD) for displaying graphical or textual information.

The illustrated embodiment of the monitoring and reporting system 330 includes a data port (not shown) configured to receive a portable memory device 335. The data port may be, for example, a Universal Serial Bus (USB). The portable memory device 335 may be, for example a USB flash drive (UFD). In the illustrated embodiment, the portable memory device 335 is configured to allow data, perhaps a log of historical ERV operational data, to be loaded and carried away for remote analysis, for example on a customer's or repairman's computer.

The illustrated embodiment of the monitoring and reporting system 300 is configured to adapt its operation to a variety of different models of ERVs having different sensor types and locations. In general, the processor 331 is configured to adapt the set of monitoring and reporting functions it performs such that it is appropriate to the model, and the types and locations of the sensors, of the particular ERV 300 to which the monitoring and reporting system 330 is coupled. Some of the monitoring functions require time as an input. Therefore, the processor 331 includes a clock (not shown), which is usually a real-time clock. As an example of how the processor 331 adapts the set of functions to the types and locations of ERV sensors available, the processor 331 is configured to carry out monitoring and reporting functions that depend upon humidity measurements only when the monitoring and reporting system 330 is coupled to an ERV 300 having humidity sensors. Otherwise, the processor 331 does not carry out those functions. Some monitoring and reporting functions can be performed using commissioning or other predetermined data in lieu of real time sensor data. The processor 331 continues to perform those functions. However, the processor 331 does not try to carry out a particular monitoring and reporting function unless it has the data required to carry it out. Some examples of monitoring and reporting functions that the processor 331 is configured to carry out will now be described.

In the illustrated embodiment, the processor 331 is configured to store and log one or more of the following: (1) the amount of time (usually expressed in hours) during which the ERV 300 has idled, (2) the times at which the ERV 300 starts, stops and jogs, (3) the amount of time during which the ERV 300 has provided free cooling, (4) the amount of time during which the ERV 300 has recovered energy, (5) the amount of time one or more motors driving the one or more enthalpy wheels have been in operation, (6) the amount of time the exhaust blower has been in operation, (7) the amount of time the ERV 300 has operated on standby power, (8) the total volume (usually expressed in cubic feet) the ERV 300 has conditioned, (9) the total volume (usually expressed in gallons) of moisture the ERV 300 has removed from outside air (available when the ERV 300 has a humidity sensor), (10) the minimum, maximum and average intake air temperatures for the ERV 300, (11) the estimated amount of power (usually expressed in kilowatt-hours, or kWh) saved by using the ERV 300, (12) the estimated effectiveness, in terms of power saved, of the ERV, (13) the amount of time any defrost heater associated with the ERV 300 has been in operation, (14) the estimated amount of power used in operating the defrost heater, (15) the amount of time one or more enthalpy wheel motors have been in operation and (16) the amount of time one or more enthalpy wheel modules ("cassettes") have been in operation.

In the illustrated embodiment, the processor 331 is further configured to adjust intake airflow to match the needed fresh air flow using the ERV pressure sensor 321 (configured to measure the overall pressure inside the ERV 300). The illustrated embodiment of the processor 331 is further configured to generate an alert should the setting of the ERV damper be incorrect (either excessive or inadequate) for the volume of outside air needed.

In the illustrated embodiment, the processor 331 is still further configured to calculate and accrue blower power consumed. In this embodiment, the commissioning data includes blower motor power consumption. Multiplying the power consumption by the time the blower motor has operated yields the total blower power consumed. In one embodiment, the processor 331 is configured to receive data from motors associated with intake and exhaust blowers of an HVAC system (not shown) of which the ERV 300 is itself associated.

In the illustrated embodiment, the processor 331 is yet still further configured to track one or more preventative maintenance items, including: (1) enthalpy wheel cleaning, including the date (and perhaps time) of the last enthalpy wheel cleaning, the estimated time the next enthalpy wheel cleaning should take place, the number of elapsed operating hours since the last enthalpy wheel cleaning, (2) intake and exhaust filter changes, including the date (and perhaps time) of the last filter changing, the estimated time the next filter changing should take place, the number of elapsed operating hours since the last filter changing, (3) permanent outside air filter screen cleaning, including the date (and perhaps time) of the last air filter screen cleaning, the estimated time the next air filter screen cleaning should take place, the number of elapsed operating hours since the last air filter screen cleaning and (4) belt replacement, including the date (and perhaps time) of the last belt replacement, the estimated time the next belt replacement should take place, the number of elapsed operating hours since the last belt replacement.

Figure 4:
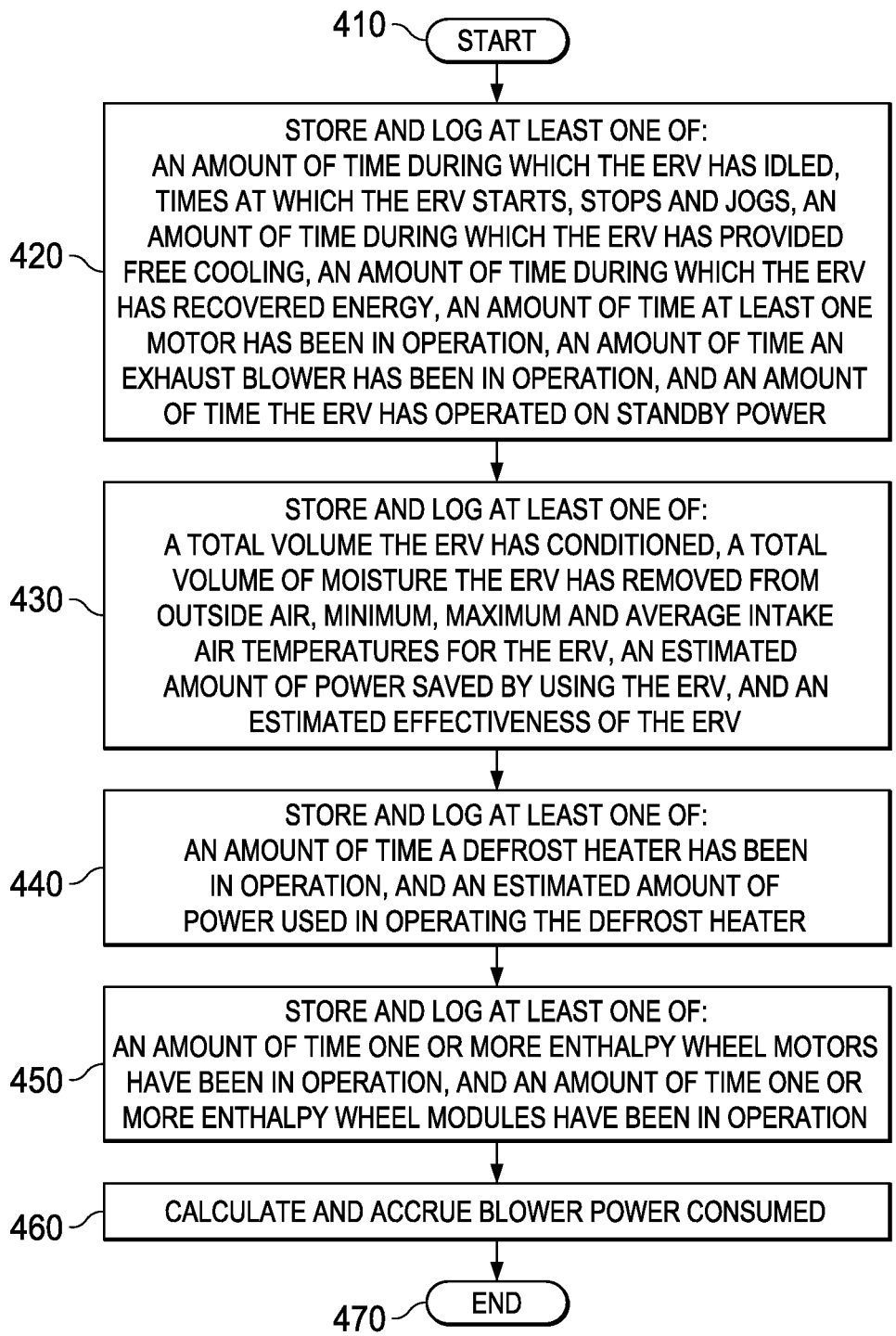
FIG. 4 is a flow diagram of one embodiment of a method of monitoring and reporting ERV power consumption.

FIG. 4 is a flow diagram of one embodiment of a method of monitoring and reporting ERV power consumption and service and maintenance needs, namely one involving the carrying out of various monitoring and reporting functions on the ERV based on a model, and types and locations of sensors, of the ERV. The method begins in a start step 410. In a step 420, at least one of: an amount of time during which the ERV has idled, times at which the ERV starts, stops and jogs, an amount of time during which the ERV has provided free cooling, an amount of time during which the ERV has recovered energy, an amount of time at least one motor has been in operation, an amount of time an exhaust blower has been in operation, and an amount of time the ERV has operated on standby power is stored and logged. In a step 430, at least one of: a total volume the ERV has conditioned, a total volume of moisture the ERV has removed from outside air, minimum, maximum and average intake air temperatures for the ERV, an estimated amount of power saved by using the ERV, and an estimated effectiveness of the ERV is stored and logged. In a step 440, at least one of: an amount of time a defrost heater has been in operation, and an estimated amount of power used in operating the defrost heater is stored and logged. In a step 450, at least one of: an amount of time one or more enthalpy wheel motors have been in operation, and an amount of time one or more enthalpy wheel modules have been in operation is stored and logged. In a step 460, blower power consumed is calculated and accrued. The method ends in an end step 470.

Figure 5:
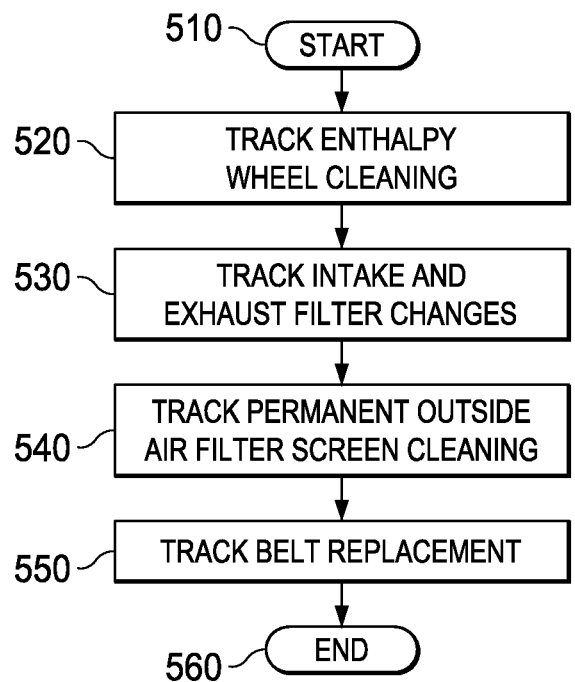
FIG. 5 is a flow diagram of one embodiment of a method of monitoring and reporting ERV service and maintenance needs.

FIG. 5 is a flow diagram of one embodiment of a method of monitoring and reporting ERV service and maintenance needs. The method begins in a start step 510. In a step 520, enthalpy wheel cleaning is tracked. In a step 530, intake and exhaust filter changes are tracked. In a step 540, permanent outside air filter screen cleaning are tracked. In a step 550, belt replacement is tracked. The method ends in an end step 560.

Those skilled in the art to which this application relates will appreciate that other and further additions, deletions, substitutions and modifications may be made to the described embodiments.

What is claimed is:

1. A system, comprising:
 a processor configured to:
  receive sensor measurements from one or more sensors coupled to an energy recovery ventilator (ERV);
  determine, based on at least a portion of the sensor measurements, an amount of time said ERV has operated; and
  determine, based on the determined amount of time said ERV has operated, an estimated effectiveness of said ERV;
  automatically generate and communicate an alert when the estimated effectiveness is below a pre-determined threshold, the alert indicating that maintenance of said ERV would be beneficial;
  determine, based on a comparison of at least a portion of the sensor measurements with one or more thresholds, whether air flow through said ERV is sufficient; and
  in response to determining that air flow is insufficient through said ERV, adjust one or more dampers of said ERV; and
 a memory coupled to said processor and configured to store data gathered from said one or more sensors coupled to said ERV.

2. The system as recited in claim 1 wherein said system is configured to receive a portable memory device.

3. The system as recited in claim 1 further comprising a display coupled to said processor and configured to provide information in visual form.

4. The system as recited in claim 1 wherein the determined amount of time said ERV has operated comprises at least one of:
 an amount of time during which said ERV has idled,
 times at which said ERV starts, stops and jogs,
 an amount of time during which said ERV has provided free cooling,
 an amount of time during which said ERV has recovered energy,
 an amount of time at least one motor driving at least one enthalpy wheel of said ERV has been in operation,
 an amount of time an exhaust blower of said ERV has been in operation, and
 an amount of time said ERV has operated on standby power.

5. The system as recited in claim 1 wherein said processor is further configured to determine, store and log at least one of:
 a total volume said ERV has conditioned,
 a total volume of moisture said ERV has removed from outside air,
 minimum, maximum and average intake air temperatures for said ERV,
 an estimated amount of power saved by using said ERV, and
 an estimated effectiveness of said ERV.

6. The system as recited in claim 1 wherein said processor is further configured to determine, store and log at least one of:
 an amount of time a defrost heater associated with said ERV has been in operation, and
 an estimated amount of power used in operating said defrost heater.

7. The system as recited in claim 1 wherein said processor is further configured to determine, store and log at least one of:
   an amount of time one or more enthalpy wheel motors associated with said ERV have been in operation, and
   an amount of time one or more enthalpy wheel modules have been in operation.

8. The system as recited in claim 1 wherein said processor is further configured to determine and accrue blower power consumed.

9. The system as recited in claim 1 wherein said processor is further configured to track preventative maintenance items selected from the group consisting of:
   enthalpy wheel cleaning,
   intake and exhaust filter changes,
   permanent outside air filter screen cleaning, and
   belt replacement.

10. The system as recited in claim 9 wherein each of said preventative maintenance items includes:
   a date of a last performing of said preventative maintenance item,
   an estimated time a next preventative maintenance item should take place, and
   a number of elapsed operating hours since said last performing of said preventative maintenance item.

11. A method, comprising:
   receiving sensor measurements from one or more sensors coupled to an energy recovery ventilator (ERV);
   determining, based on at least a portion of the sensor measurements, an amount of time said ERV has operated; and
   determining, based on the determined amount of time said ERV has operated, an estimated effectiveness of said ERV;
   automatically generating and communicating an alert when the estimated effectiveness is below a pre-determined threshold, the alert indicating that maintenance of said ERV would be beneficial;
   determining, based on a comparison of at least a portion of the sensor measurements with one or more thresholds, whether air flow through said ERV is sufficient; and
   in response to determining that air flow is insufficient through said ERV, adjusting one or more dampers of said ERV; and
   storing data gathered from said one or more sensors coupled to said ERV.

12. The method as recited in claim 11 further comprising transferring said data to a portable memory device.

13. The method as recited in claim 11 further comprising provide information in visual form.

14. The method as recited in claim 11 wherein the determined amount of time said ERV has operated comprises at least one of:
   an amount of time during which said ERV has idled,
   times at which said ERV starts, stops and jogs,
   an amount of time during which said ERV has provided free cooling,
   an amount of time during which said ERV has recovered energy,
   an amount of time at least one motor driving at least one enthalpy wheel of said ERV has been in operation,
   an amount of time an exhaust blower of said ERV has been in operation, and
   an amount of time said ERV has operated on standby power.

15. The method as recited in claim 11 further comprising determining, storing and logging at least one of:
   a total volume said ERV has conditioned,
   a total volume of moisture said ERV has removed from outside air,
   minimum, maximum and
   average intake air temperatures for said ERV,
   an estimated amount of power saved by using said ERV, and an estimated effectiveness of said ERV.

16. The method as recited in claim 11 further comprising determining, storing and logging at least one of:
   an amount of time a defrost heater associated with said ERV has been in operation, and
   an estimated amount of power used in operating said defrost heater.

17. The method as recited in claim 11 further comprising determining, storing and logging at least one of:
   an amount of time one or more enthalpy wheel motors associated with said ERV have been in operation, and
   an amount of time one or more enthalpy wheel modules have been in operation.

18. The method as recited in claim 11 further comprising determining and accruing blower power consumed.

19. The method as recited in claim 11 further comprising tracking preventative maintenance items selected from the group consisting of:
   enthalpy wheel cleaning,
   intake and exhaust filter changes,
   permanent outside air filter screen cleaning, and
   belt replacement.

20. The method as recited in claim 19 wherein each of said preventative maintenance items includes:
   a date of a last performing of said preventative maintenance item,
   an estimated time a next preventative maintenance item should take place, and
   a number of elapsed operating hours since said last performing of said preventative maintenance item.

* * * * *